United States Patent
Lingafelt et al.

(10) Patent No.: US 8,331,545 B2
(45) Date of Patent: Dec. 11, 2012

(54) HANDLING COMMUNICATION SESSION DISCONNECTION AND RECONNECTION

(75) Inventors: Steven G. Lingafelt, Durham, NC (US); Martinianus B. Hadinata, Alte Kantonsstrasse (CH); John E. Moore, Jr., Brownsburg, IN (US); Brian M. O'Connell, Cary, NC (US); Keith W. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 12/332,436

(22) Filed: Dec. 11, 2008

(65) Prior Publication Data

US 2010/0150320 A1 Jun. 17, 2010

(51) Int. Cl.
*H04M 3/42* (2006.01)
(52) U.S. Cl. .................... 379/202.01; 455/416
(58) Field of Classification Search .............. 379/202.01–206.01, 88.22–88.25; 455/416
See application file for complete search history.

(56) References Cited

U.S. PATENT DOCUMENTS

| 5,471,318 | A  | * | 11/1995 | Ahuja et al. ............... 358/400 |
| 6,343,216 | B1 |   | 1/2002  | Kim et al. |
| 6,868,080 | B1 |   | 3/2005  | Umansky et al. |
| 7,003,286 | B2 | * | 2/2006  | Brown et al. ............... 455/416 |
| 7,085,558 | B2 | * | 8/2006  | Berstis et al. .............. 455/416 |
| 2002/0176546 | A1 | * | 11/2002 | Dietz et al. .............. 379/67.1 |
| 2007/0133523 | A1 |   | 6/2007  | Kwon |
| 2007/0133524 | A1 |   | 6/2007  | Kwon |

* cited by examiner

*Primary Examiner* — Simon Sing
(74) *Attorney, Agent, or Firm* — Yudell Isidore Ng Russell PLLC

(57) ABSTRACT

A method, system and computer program product records missed information that is communicated between one or more connected communication terminals during a disconnection period and replays the missed information when a temporarily-disconnected communication terminal reconnects to the active communication session. The method comprises: detecting disconnection of the communication terminal from the active communication session; in response to detecting the disconnection, automatically recording the missed information exchanged between the one or more connected communication terminals remaining in the active communication session; detecting reconnection of the disconnected terminal to the active communication session; and delivering the recorded information exchange to the reconnected terminal, in response to detecting the reconnection.

17 Claims, 8 Drawing Sheets

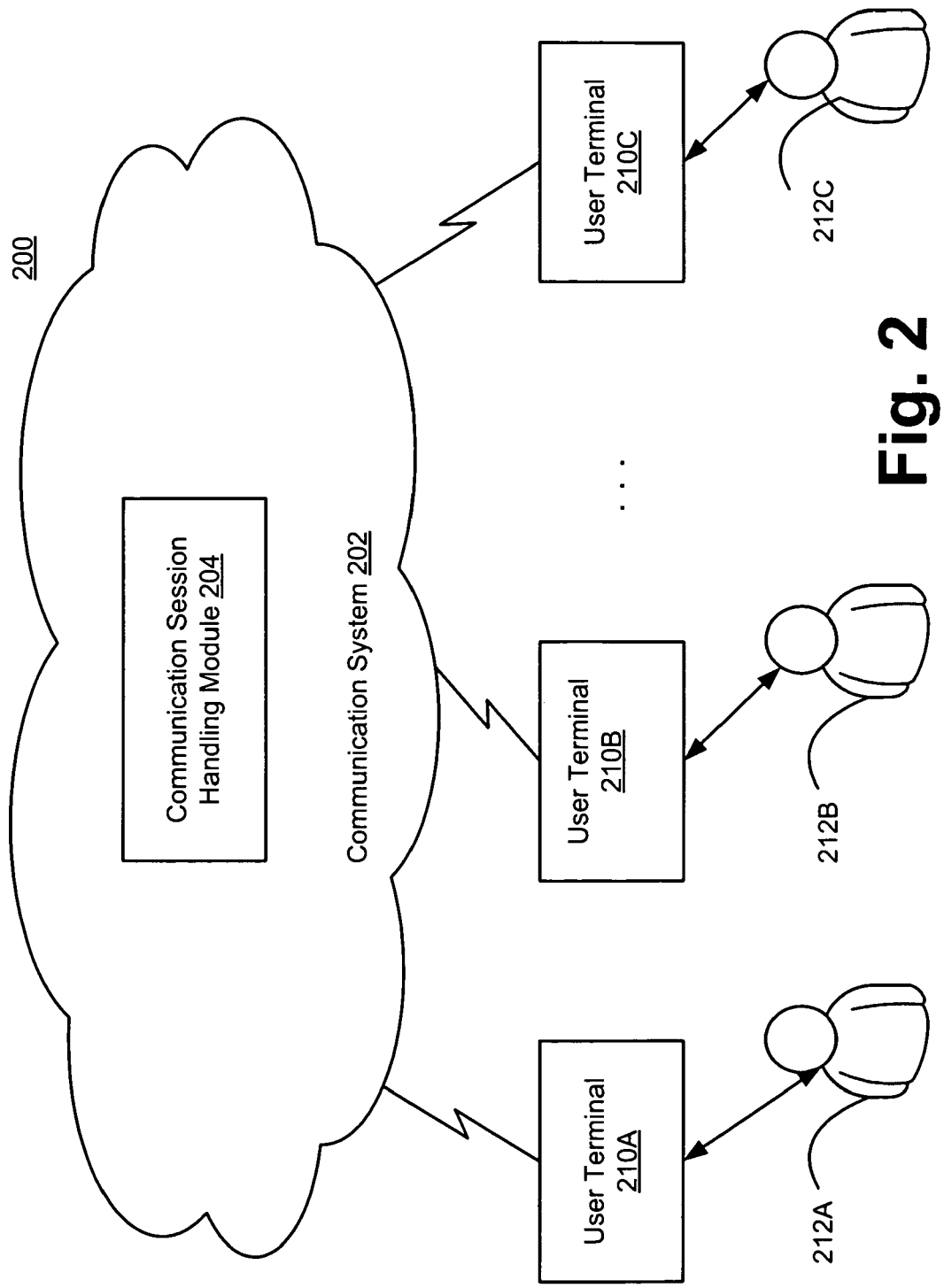

HANDLING COMMUNICATION SESSION DISCONNECTION AND RECONNECTION

BACKGROUND

1. Technical Field

The present invention generally relates to communication systems and in particular to handling reconnection to a communication session by a disconnected terminal.

2. Description of the Related Art

A common problem with electronic communication and information exchange, regardless of the type of communication (e.g. Voice-over-Internet Protocol—VoIP—, land-line, cellular/mobile/wireless telephone, and others) is that a user terminal may occasionally be temporarily disconnected from the communication network/system, typically due to a localized problem. This problem is more frequently encountered with mobile communication systems where communication (such as a mobile conversation or other type of communication exchange) is routed via a mobile service provider between two or more user terminals. During the duration between disconnection and reconnection of a user terminal, the disconnected user terminal cannot receive the communicated information (conversation, text, or data) being exchanged/taking place between the other party(s) to the active communication session.

Currently, for example, upon reconnection of a temporarily-disconnected party to an ongoing conversation, the participants in the conversation are often required or requested to repeat the missed conversation that was exchanged during the period in which the disconnected party's user terminal was temporarily disconnected. This repeat of missed communication takes additional effort on the part of the participants, who have to identify the point in the conversation that communications was lost with the disconnected party's terminal, recall the content of what was exchanged during the interim period, and then repeat portions of the conversation that was missed. In larger group communications, such as a conference call, such a call for a repeat of communication would cause a disruption/stoppage of the ongoing conference, leading to a great inconvenience for the other conference participants. Valuable time will also be lost in bringing the now re-connected party up to speed. Also, a verbal summary of a conversation shared by one of the participants is often deficient in providing a complete/accurate picture to the disconnect party of what content/conversation exactly was exchanged during the period of disconnection.

SUMMARY OF ILLUSTRATIVE EMBODIMENTS

Disclosed are a method, system and computer program product for recording missed information that is communicated between one or more connected communication terminals during a disconnection period and replaying the missed information for a temporarily-disconnected communication terminal, when the temporarily-disconnected communication terminal reconnects to the active communication session. The method comprises: detecting disconnection of the communication terminal from the active communication session; in response to detecting the disconnection, automatically recording the missed information exchanged between the one or more connected communication terminals remaining in the active communication session; detecting reconnection of the disconnected terminal to the active communication session; and delivering the recorded information exchange to the reconnected terminal, in response to detecting the reconnection. The method further comprises rejoining the reconnected terminal to the active communication session, after delivering the missed information to the reconnected terminal. In one embodiment, the recorded information is processed according to pre-established user preferences.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 2 is a system-level diagram of a communication system equipped with a communication session handling module and supported communication terminals, in accordance with one embodiment of the invention;

DETAILED DESCRIPTION OF AN ILLUSTRATIVE EMBODIMENT

Figure 1:
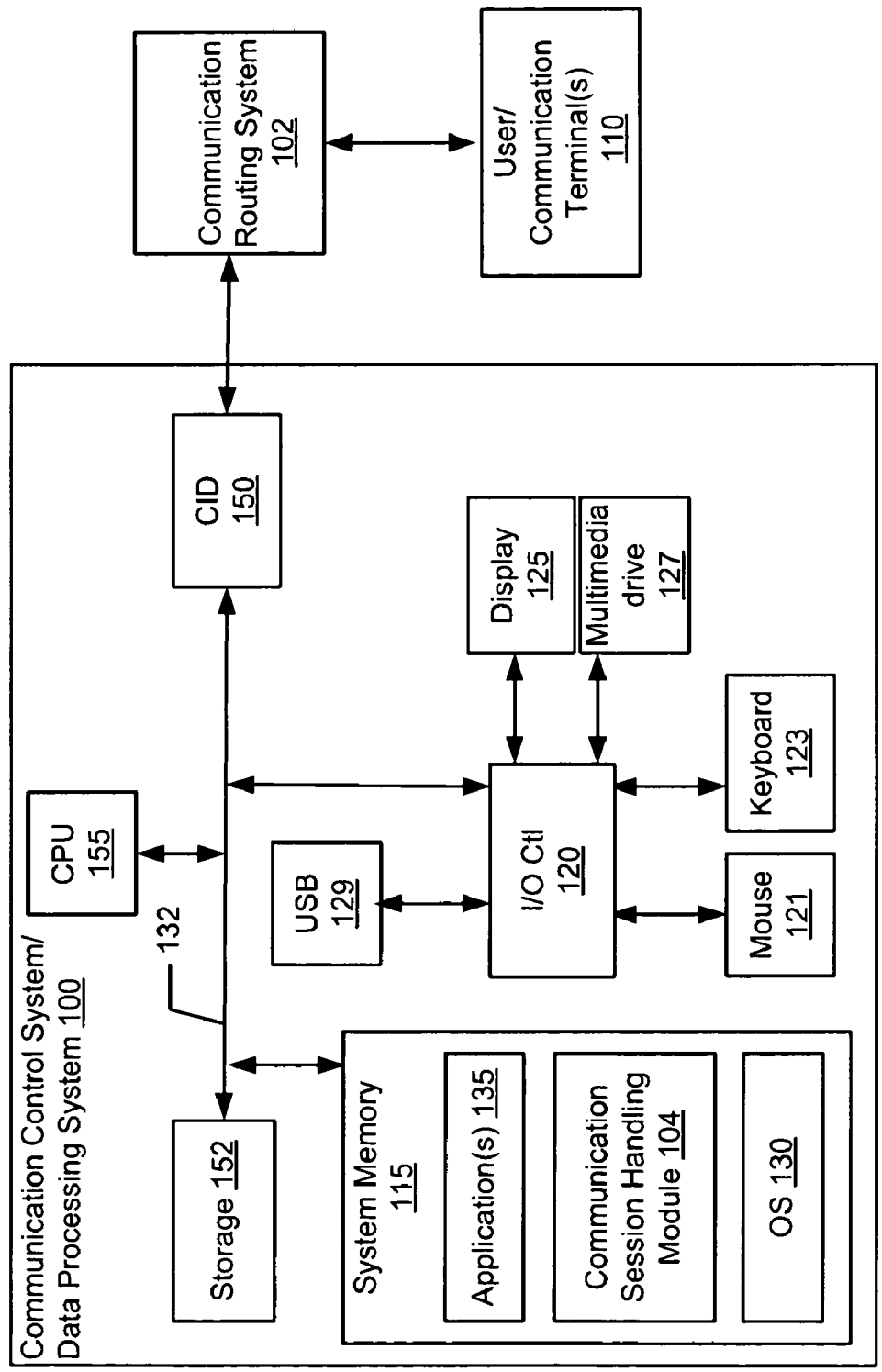
FIG. 1 is a block diagram of a data processing system configured with hardware and software components providing the functionality of a communication session handler for a connected communication terminal, according to one embodiment of the invention.

The illustrative embodiments provide a method, system and computer program product for recording missed information that is communicated between one or more connected communication terminals during a disconnection period and replaying the missed information when a temporarily-disconnected communication terminal reconnects to the active communication session.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention.

The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. The term communication terminal is interchangeable with user terminal and may include wireless communication device, mobile communication device, cellular telephone, VoIP (Voice-over-Internet Protocol) terminal, land-line (Public Switched Telephone Network—PSTN) telephone, cordless telephones, personal computer (PC), laptop computer, and any other device that supports/enables connection with a second device for communication exchange.

With reference now to the figures, FIG. 1, there is a block diagram of a data processing system configured with hardware and software components that enable the data processing system (DPS) to be utilized as and/or provide the functionality of a communication control device/system. For simplicity in describing the illustrated device, the device is hereinafter referred to as DPS 100. DPS 100 comprises at least one processor or central processing unit (CPU) 155 connected to system memory 115 via system interconnect/bus 132. System memory 115 is defined as a lowest level of volatile memory (not shown), including, but not limited to, cache memory, registers, and buffers. The system memory 115 includes an Operating System (OS) 130, applications 135 and communication session handling module 104. Also connected to system bus 132 is I/O controller 120, which provides connectivity and control for input devices, of which pointing device (or mouse) 121 and keyboard 123 are illustrated, and output devices, of which display 125 is illustrated. Additionally, a multimedia drive 127 (e.g., CDRW or DVD drive) and USB (universal serial bus) hub 129 are illustrated, coupled to I/O controller 120. Multimedia drive 127 and USB hub 129 may operate as both input and output (storage) mechanisms. DPS 100 also comprises storage 152, within which data/instructions/code may be stored.

DPS 100 is also illustrated with communication system interface device (CID) 150 coupled to system bus 132. CID 150 enables DPS 100 to connect to one or more communication networks, such as within a mobile communication system. As illustrated, CID 150 connects DPS 100 to communication routing/exchange system 102, which may be connect to or integrated within a mobile communication system, the Internet and/or other public communication networks and infrastructure. One or more communication terminals (or user terminals) 110 connect to communication routing/exchange system 102 and enable exchange of communication information during an ongoing, active communication session, as described below.

In the described embodiments, the Internet is a worldwide collection of networks and gateways that utilize the Transmission Control Protocol/Internet Protocol (TCP/IP) suite of protocols to communicate with one another. Of course, network access may also be provided via a number of different types of networks, such as an intranet, a wired or wireless local area network (LAN), a virtual private network (VPN), or other wired or wireless wide area network (WAN), for example. Access may be compatible with cellular communications systems, satellite communications systems, or the like. Those of ordinary skill in the art will appreciate that user terminal 110 depicted in FIG. 1 may represent any one or more of the various different types of communication devices and not necessarily limited to ones that required a "user" per se.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. DPS 100 depicted in FIG. 1 may be, for example, an IBM eServer pSeries system, a product of International Business Machines Corporation in Armonk, N.Y., running the Advanced Interactive Executive (AIX) operating system or LINUX® operating system.

Notably, in addition to the above described hardware components of DPS 100, various features of the invention are completed via software (or firmware) code or logic stored within system memory 115 or other storage (e.g., storage 152) and executed by CPU 155. In one embodiment, data/instructions/code from storage 152 populates the system memory 115. Thus, illustrated within memory 115 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute, or Advanced Interactive eXecutive—AIX—, registered trademark of International Business Machines—IBM), user device disconnection settings (UDDS) utility 135, and communication session handling module 104.

As provided in the illustrative embodiments, UDDS utility 135 enables individual user terminals to establish pre-set recording and playback preferences for that specific user terminal. These preferences are stored and maintained in a database of terminal preferences that is accessed by communication session handling module 104 when a related user terminal disconnects from an ongoing/active communication. Default settings are provided and utilized for all terminals without such pre-set preferences.

In actual implementation, UDDS utility 135 and communication session handling module 104 may be combined as a single application collectively providing the various functions of each individual software component when the corresponding code is executed by the CPU 155. For simplicity, the communication session handling module 104 is illustrated and described as a stand alone or separate software/firmware component, which is stored in memory 115 to provide/support the specific novel functions described herein. In one embodiment, communication session handling module 104 is downloaded to DPS 100 from a remote server that is associated with a service provider of the communication system.

With reference now to FIG. 2, a block diagram of a communication system with a communication session handling module is shown. Communication system 202 includes communication session handling module 204. Communication system 202 is operable to interconnect communications via a plurality of user terminals 210A, 210B and 210C (or communication terminals) between users 212A, 212B and 212C, respectively. Communication system 202 may support mobile phone communications, satellite phone/video communications, VoIP communications, video communications, text, Internet and other forms of communication provided by a service provider. User terminals 210A, 210B and 210C may include a cellular phone, mobile phone, satellite phone, a personal digital assistant (PDA), a laptop computer, and other voice and/or video enabled devices. Furthermore, communication session handling module 204 of communication system 202 may be incorporated for use in local subsystems. The communication session handling service provided by communication system 202 may be independently provisioned for only those consumers who choose the service to recover and record missed information exchange of an active communication session during a disconnect interval.

Figure 3A:
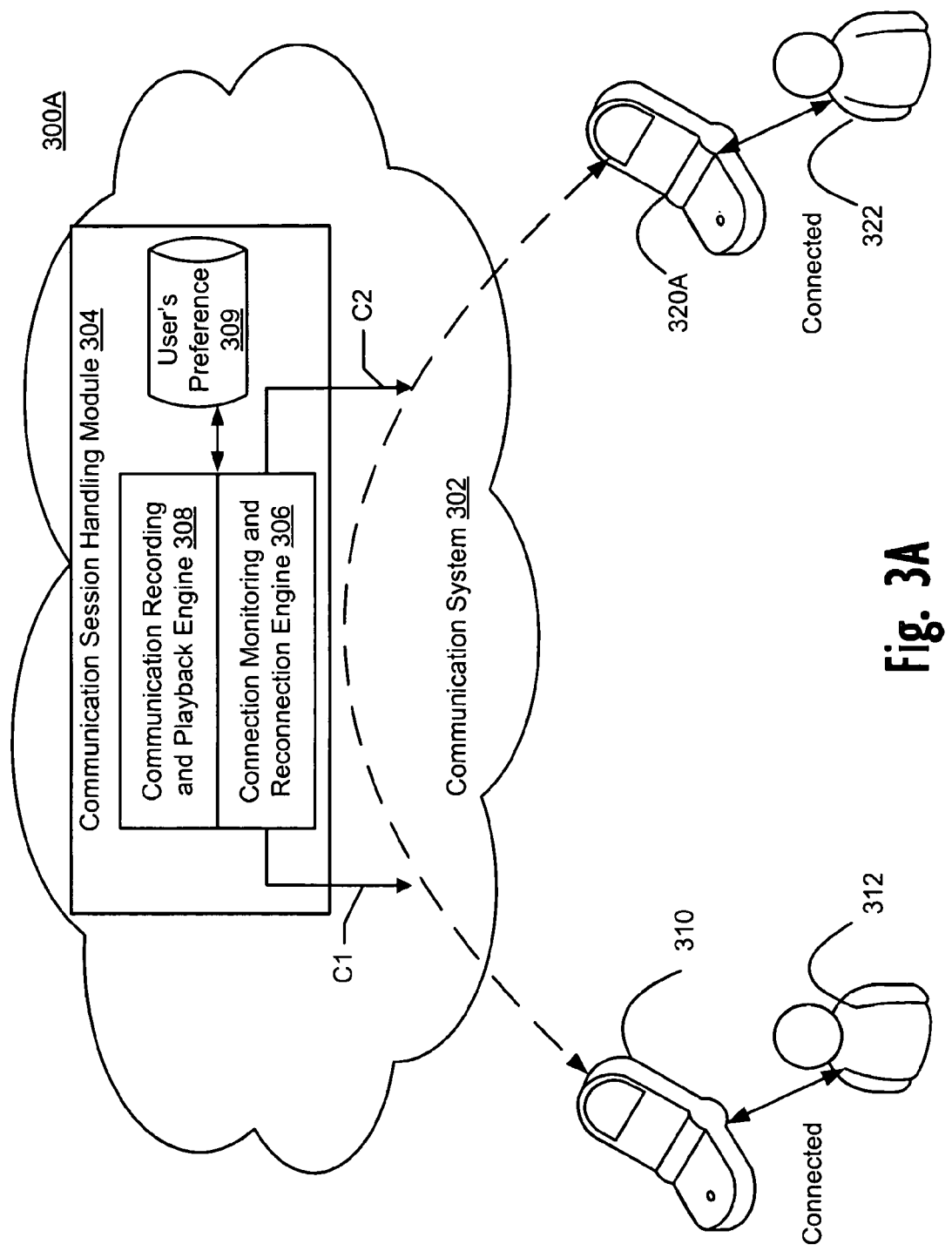
FIG. 3A is a block diagram of a two connected mobile phones, utilized as communication terminals in communication via the communication system of FIG. 2, in accordance with one embodiment of the invention.

FIG. 3A is a block diagram 300A of two connected mobile phones 310 and 320A where communications or an information exchange between users 312 and 322 take place via communication system 302. The arched-dashed line between connected mobile phones 310 and 320A denotes ongoing communications or information exchange with completed path(s) through the communication system 302.

The communication session handling module 304 of communication system 302 includes a connection monitoring and reconnection engine 306, a communication recording and playback engine 308 and user's preference database 309. Upon connection of mobile phones 310 and 320A, connection monitoring and reconnection engine 306 begins monitoring the communication paths such as on at least one or both of lines C1 and C2 of an active communication session.

Figure 3B:
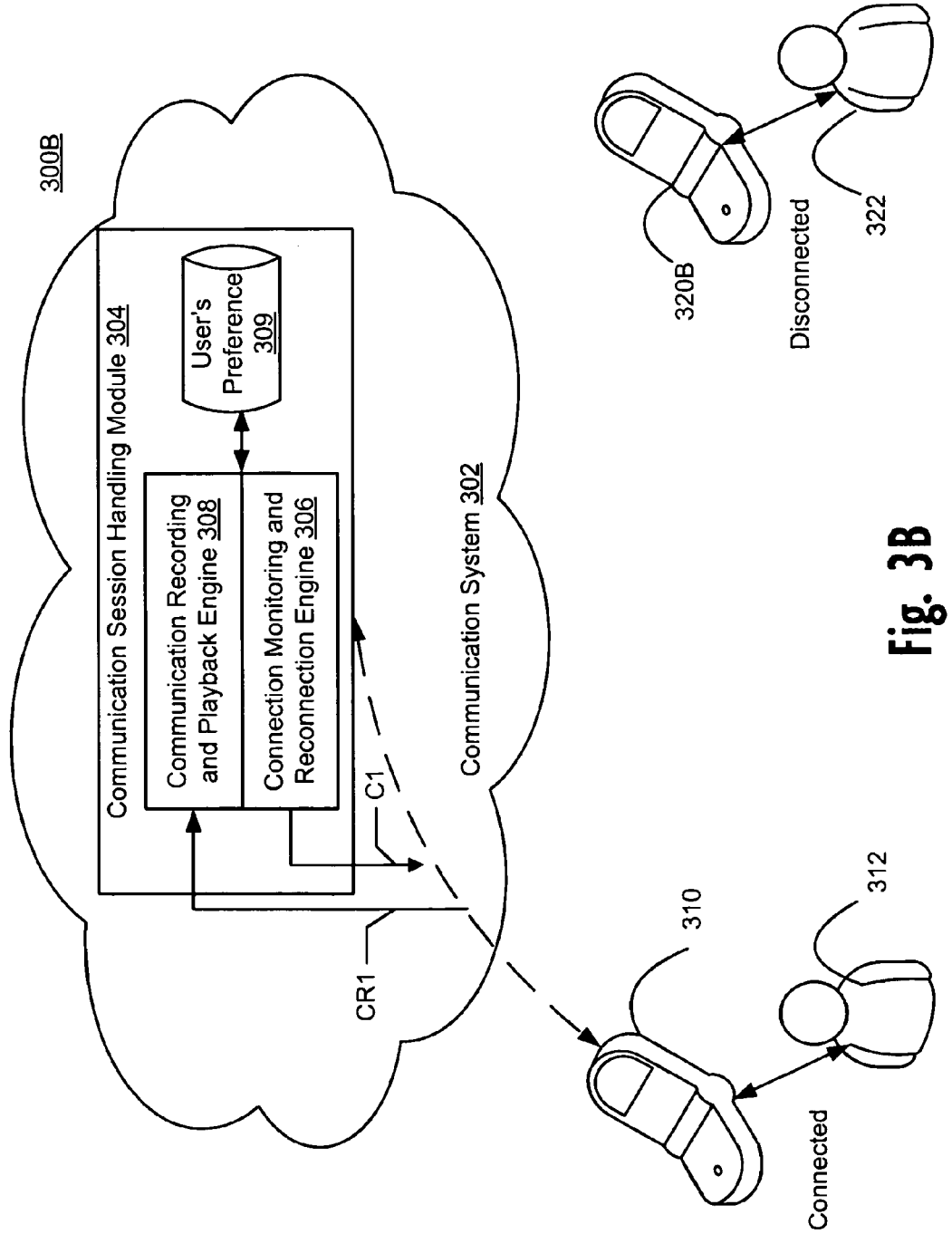
FIG. 3B is a block diagram illustrating the disconnection of one of the mobile phones of FIG. 3A from the communication system of FIG. 2 during which period recording on ongoing communication occurs, in accordance with one embodiment of the invention.
Figure 4:
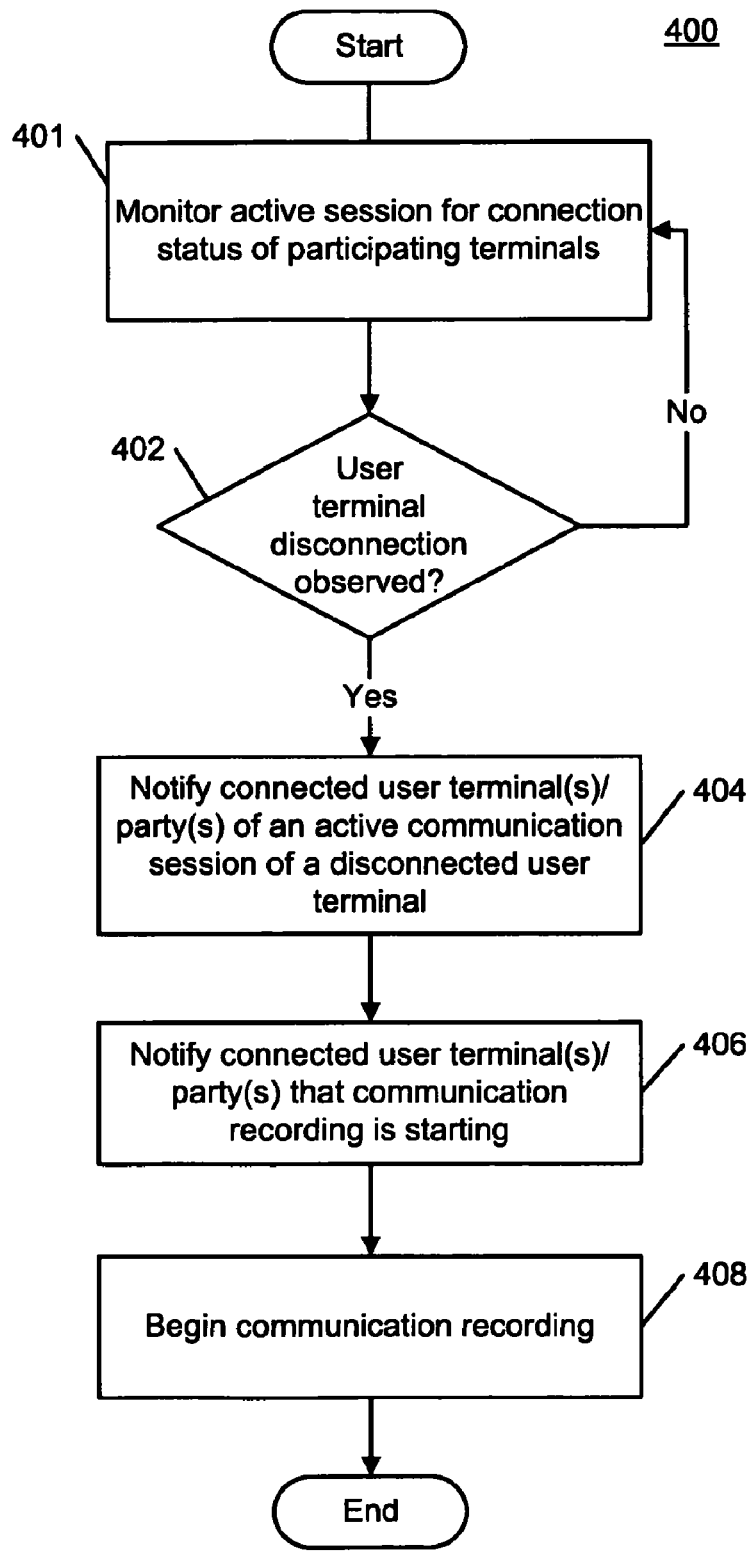
FIG. 4 is a flowchart of a process for activating the recording of missed information, exchanged during a disconnect interval, in accordance with one embodiment of the invention.

FIG. 4 is a flowchart of a process to initiate recording of missed information exchange during a disconnect interval. The process of FIG. 4 will be described in conjunction with the illustrations of the block diagrams in FIGS. 3A and 3B for mobile phone communications between user (communication) terminals. As illustrated, the process 400 begins with block 401 at which the module 304 monitors for the connection status of each of the terminals participating in an active/ongoing communication. At block 402, a determination is made whether a user terminal disconnection is detected. If no disconnection is detected, process 400 loops back to block 401. However, if a user terminal is disconnected (from the ongoing, active session), then at block 404, process 400 notifies or informs one or more of the remaining connected party(s) (e.g. user 312) that the disconnected user terminal (e.g. user 322) is disconnected. As provide by FIG. 3B, the user terminal (or mobile phone 310) remains connected to the active communication session; However, the user terminal (or mobile phone 320A) becomes disconnected. At block 406, one or more of the remaining party(s) (e.g. user 312) are notified that a recording of the communications or information exchange of the active communication session is starting. The party(s) is/are notified by sending, forward or communicating a signal, announcement or tone to the connected user terminal (e.g., mobile phone 310) indicative of the starting of the recording process. At block 408, recording of the communications or information exchange commences and the recording is stored at the communication control system (see FIG. 1).

In alternate embodiments, no notification is provided to the remaining participants to the ongoing, active communication session, as the disruption of providing the notification may interfere with the communication and cause the participants to stall or wait for a reconnection. However, regardless of whether or not a notification is sent, the recording is activated from the point of disconnection. A duplex recording (or larger number of parallel recording) schema may also be implemented to enable multiple recordings to overlap from different points during the active communication as different user terminals become temporarily disconnected. Further, in one implementation, a user who does not intend to reconnect to the active session and who therefore does not require a recording of the active session may pressed a particular button (numeric entry) or enter a particular code (sequence of buttons) before deliberately disconnecting the user terminal. On receipt of this entry prior to a disconnection, the module recognizes the disconnection was deliberate and does not initiate the recording function.

With reference now to FIG. 3B, a block diagram 300B of a disconnected mobile phone which has temporarily lost communication with the communication system is shown. Mobile phone 310 is designated as the connected mobile phone or user terminal during the active communication session. Mobile phone 320B is designated as the disconnected mobile phone or user terminal, and that portion of the dashed line denoting ongoing communications with a completed path(s) through the mobile communication system 302 to mobile phone 320B is removed. In one embodiment, (connected) mobile phone 310 is notified that the recording of the communications or information exchange is starting (see block 406 of FIG. 4). Since the mobile phone 310 remains connected, the connection monitoring and reconnection engine 306 may continue to monitor the communication path (i.e., communication occurring on line C1). Furthermore, the communication recording and playback engine 308 begins recording (block 408 of FIG. 4) the communications or information exchange (on line CR1) that is being missed by a user of (disconnected) mobile phone 320B. The missed communications or information exchange may be a conversation, text message, video and/or audio information exchanged between users 312 and 322 via mobile phones 310 and 320B, respectively.

Figure 3C:
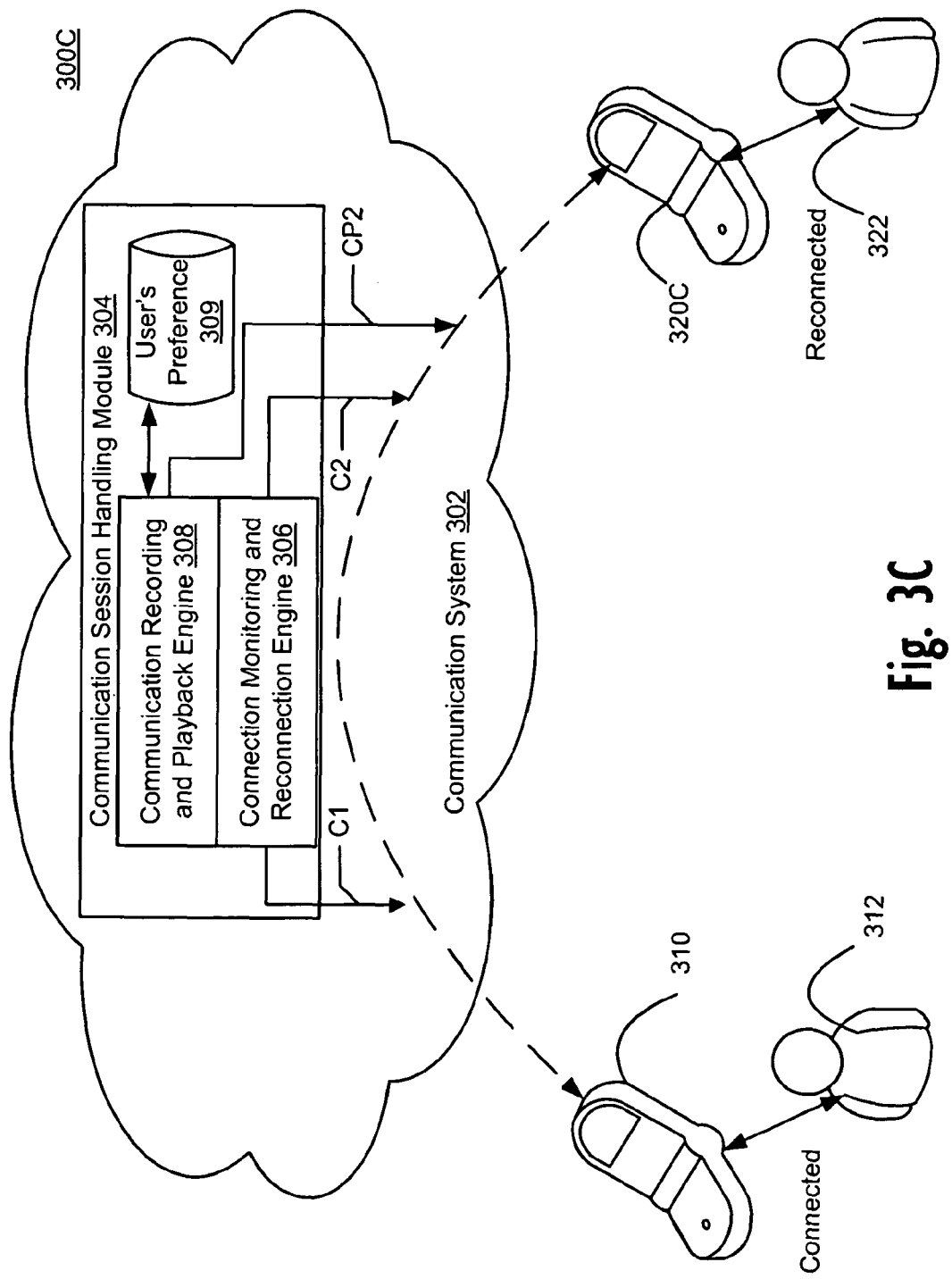
FIG. 3C is a block diagram illustrating the re-connection of the disconnected mobile phone to the communication system of FIG. 2, which triggers the replay of missed communication, in accordance with one embodiment of the invention.

FIG. 3C is a block diagram of (connected) mobile phone 310 in communication with reconnected mobile phone 320C via communication system 302, which provides automatic delivery of missed communications or information exchange to reconnected mobile phone 320C. In FIG. 3C, the arched-dashed line is complete between mobiles phones 310 and 320C when the disconnected party is reconnected. Thus, monitoring for disconnection may continue on line C1 and will begin again on line C2. During the period of time the user (e.g. user 322) is disconnected, system 302 attempts to automatically reconnect the disconnected user terminal (mobile phone 320B).

Figure 5:
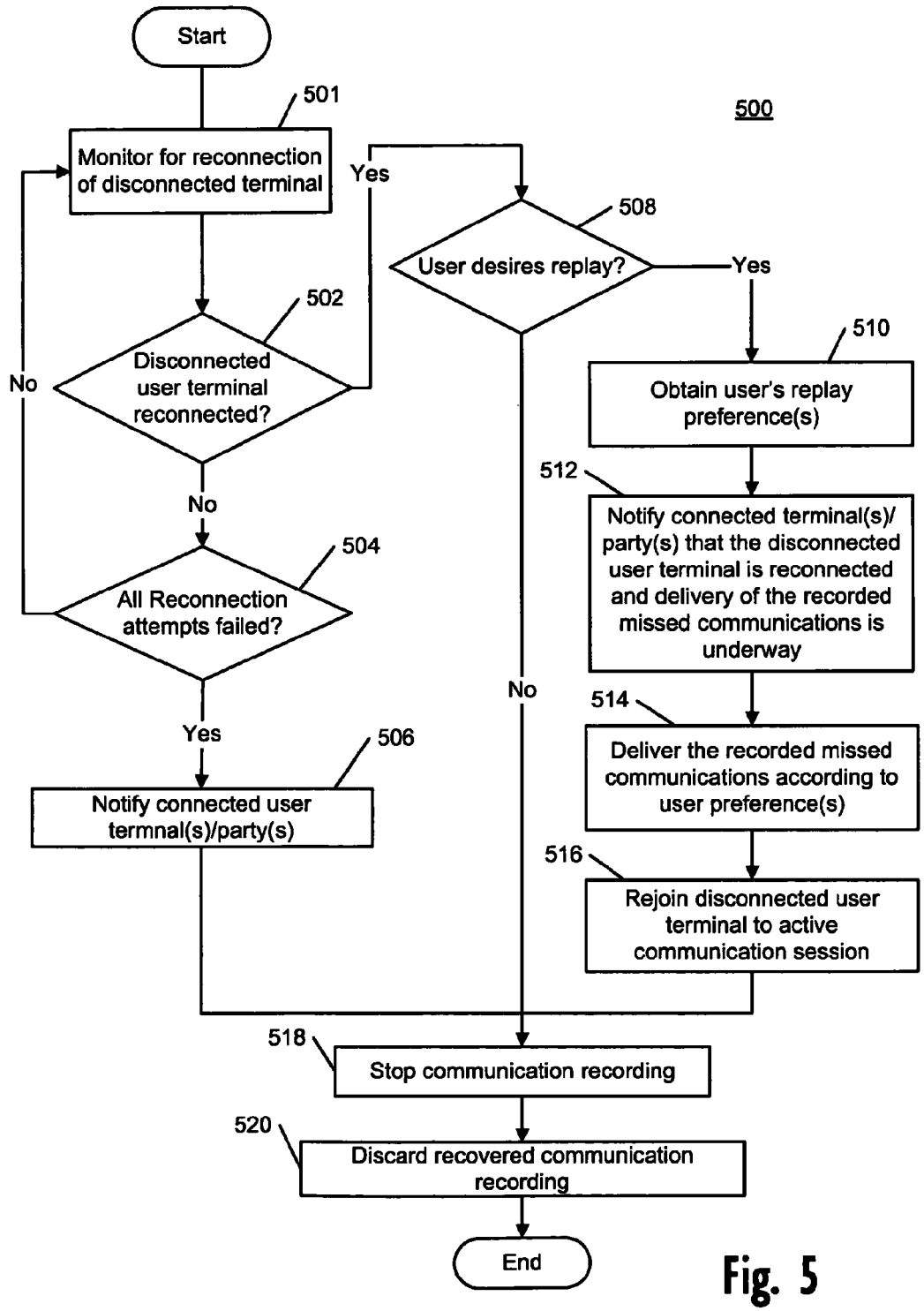
FIG. 5 is a flowchart of the process by which the replaying of the recorded communication information is provided to the re-connected terminal, according to one embodiment of the invention.

FIG. 5 is a flowchart of the process by which communication session handling module 304 of the communication system 302 delivers recorded, missed communications to a reconnected user terminal, according to pre-established user preferences. FIG. 5 will be described in conjunction with FIG. 3C. Process 500 begins with block 501 with the module monitoring for a reconnection by the disconnected user terminal to the communication session. At block 502, a determination is made whether the disconnected user terminal (mobile phone 320C) is reconnected. If the user terminal is not reconnected, a determination is made at block 504 whether all reconnection attempts have failed. This determination is based on a pre-set amount of time established for a disconnected terminal to reconnect to the ongoing communication session before the module stops the recording. If at block 504 the amount of time has not elapsed," the process 500 returns to block 501. However, if at block 504 the amount of time has elapsed without a reconnection by the user terminal, the modules sends a signal to connected mobile phone 310 to notify one or more of the connected party(s) (e.g. user 312) that the reconnection did not occur, at block 506. If the reconnection attempts fail, the module halts the recording, at block 518, and the recording is discarded, at block 520. Reconnection failure may be due to the disconnected user failing to re-establish contact within a time period, or the number of attempts to re-establish contact exceeds a maximum number allowed, or for some other reason. The signal sent at block 506 may also notify the one or more connected party(s) of the halting of the recording.

Returning again to block 502, if the reconnection of the user terminal is detected, then at block 508, a determination is made whether the user desires/requests a replay of the missed communications or information exchange. The term "replay" means the delivery of the recorded missed communications or information exchanged by/between connected user(s) or user terminal(s) during the ongoing, active communication session to the reconnected user or user terminal, when reconnection is established. For example, the reconnected user may be prompted by the system 302 to indicate whether replay is desired. This replay may be provided by a service provider or communication equipment manufacturer, as an add-on service for conference calls, for example, If the user terminal does not have/support the service, then the communication session handling service may not be provided. Thus, if the determination at block 508 is that the user/user terminal does not require/request a replay of missed communications (or the user has not subscribed to this service), then the recording of the missed communications or information exchange is stopped, at block 518, and the recording is discarded, at block 520.

The recording of the missed communications or information exchange that began at block 408 may continue until the storage, which holds the recording, is exhausted, or a maximum duration is reached, or the disconnected user terminal is reconnected. While not expressly shown, it is appreciated that the exhaustion of storage and/or reaching of a pre-established maximum duration are full-enabled, alternate embodiments of the described invention.

Returning again to block 508, if the determination at block 508 indicates that the user/user terminal does require the playback, then the user's preference(s) for replay or delivery are obtained from the user's preference database 309, at block 510. At block 512, the one or more connected party(s) to the active communication session (e.g., via connected mobile phone 310) are notified that the disconnected user has been reconnected and is obtaining the (recorded) missed communications or information exchange. At block 514, the reconnected user is delivered or played the recorded missed communications on line CP2, of FIG. 3C, at block 514. The replay is provided in accordance with the user's preferences, which may be pre-set or entered/modify during the playback. For example, a user may desire the replay to be completed at 2× speed to enable the user to catch up to the ongoing communication session. After the replay of the missed communications or information exchange is completed, the terminal of the reconnected user 322 (reconnected mobile phone 320C) is rejoined to the active communication session, at block 516. The module then stop the recording of the missed communications or information exchanged, at block 518, and the module discards the recorded communication, at block 520.

As can be readily seen, the communication session handling service improves a users' experience, when one or more of the participants of an active communication session are inadvertently disconnected, by recording the missed communications or information exchange of the connected participants or terminals during the disconnection interval, reconnecting the disconnected user terminal, optimally delivering or replaying the missed communications or information exchange to the user terminal, and then rejoining the reconnected user terminal to the active communication session.

As introduced at block 510, the user's preference(s) include one or more playback or delivery features. For example, one feature is whether the recorded missed communications or information exchange should be played back at 1×, 2×, or 3× the speed, referred to as a replay rate. Furthermore, a playback or delivery feature may include one or more user specified conditionings. User specified conditionings may include noise removal, silence removal, music removal, etc. System 302, either during the action of recording, or in post-processing of the recording or in playback of the recording, alters the missed communications or information exchanged. Examples of the alterations include the removal of silence from audio streams, and the removal of background noise (which improves the high speed playback experience), among others.

If the user terminal is successfully reconnected, the user (terminal) is given the option to listen (if audio), view (if video), see (if text), or a combination of each, where appropriate, the recorded missed communications or information exchanged. User options may be pre-configured by the service provider. If the user is to be given the recorded missed communications or information exchange, the user may choose to playback the recording at faster rates than the communication/information was recorded. User options may include a mechanism or interface, such as a touch pad, key pad, or voice-based recognition device, which enables the user to interface with system 302, to enter a response, to replay the missed communications or information exchanged, and enter user preferences for such recording and replaying features.

Figure 6:
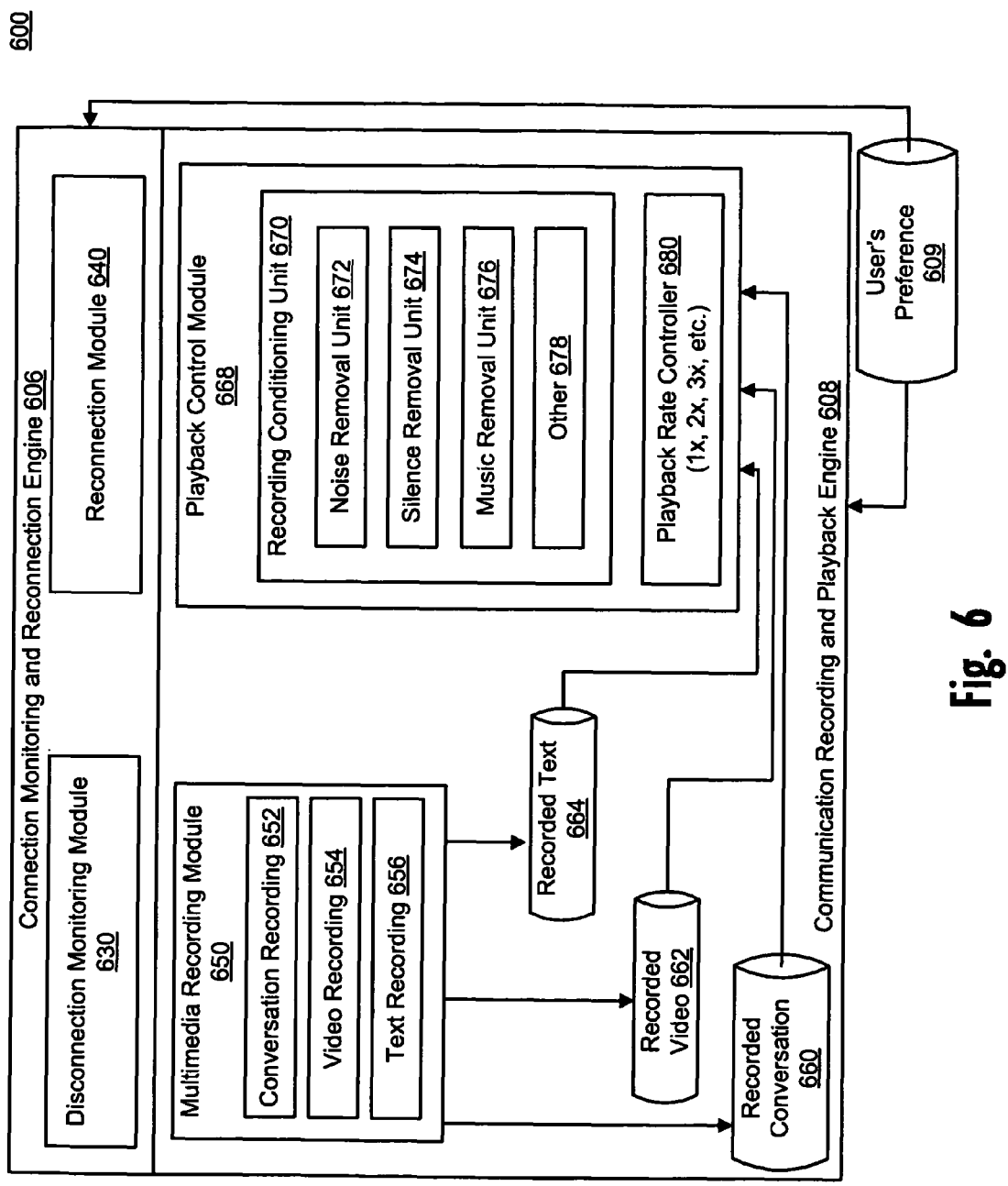
FIG. 6 is a block diagram of the communication session handling module, according to one embodiment of the invention.

FIG. 6 is a block diagram of communication session handling module 600 for use in the mobile communication system 202 of FIG. 2. Connection monitoring and reconnection engine 306 includes a disconnection monitoring module 630 and a reconnection module 640. An exemplary reconnection method for a disconnected user terminal is described in U.S. Pat. No. 6,343,216, "Method of Automatically Reconnecting a Dropped Call in a Mobile Communication System," incorporated herein by reference as if set forth in full below.

Communication recording and playback engine 608 includes multimedia recording module 650 and playback control module 668. Multimedia recording module 650 is configured to record conversations 652, video 654 and text 656 which are stored in recorded conversation storage 660, recorded video storage 662 and recorded text storage 664, respectively. Playback control module 668 will retrieve the user's preferences from the user's preference database 609 for playing back or delivery of the recorded missed communications or information exchange. Also, playback control module 668 processes the recorded missed communications, such as in recording conditioning unit 670 or playback rate controller 680. Recording conditioning unit 670 provides a plurality of conditioning processes, such as a process to remove noise via noise removal unit 672, a process to remove silence intervals via a silence removal unit 674, a process to provide music removal via a music removal unit 676, and processes for addressing/manipulating other conditionings 678.

The user's preference database 609 includes, for each subscribed user, the replay or delivery preference(s) for recorded, missed communication. Examples, of user selectable preferences include a maximum number of reconnection attempts and/or the length of time to attempt reconnection; a maximum duration of recording of the missed communications or information exchange; and a rate of replay of the recorded missed communications or information exchange. The options for the replay rate include, for example, 1×, 1.5×, 2×, 3×, 4×, etc. of the speed. The recording conditioning includes silence removal, noise removal, music removal, etc. The list of user's preferences are only illustrative and may include a variety of other user options.

Advantages of the communication session handling service includes, for example, elimination of the manual effort required to identify the point in the conversation or information exchange where a connection was lost; and a reduction in the time needed to "repeat" the conversation or information exchange by replaying the saved conversation or information exchange for the reconnected party (terminal) at a faster pace than normal speech rates and/or by elimination of silent or otherwise un-useful periods.

In the flowcharts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for handling missed information communicated by one or more connected terminals during an active communication session from which at least one communication terminal has disconnected, the method comprising:
receiving user preferences for recording missed information and delivering recorded missed information;
storing the user preferences;
detecting disconnection of a communication terminal from the active communication session;
in response to detecting the disconnection, automatically recording missed information communicated by the one or more connected terminals remaining in the active communication session;
processing subsequently recorded missed information in accordance with the stored user preferences; and
detecting reconnection of the communication terminal to the active communication session; and
autonomously delivering a recording of the missed information to the reconnected communication terminal, wherein the autonomously delivering includes delivering the subsequently recorded missed information according to the stored user preferences.

2. The method according to claim 1, further comprising:
responsive to detecting reconnection of the communication terminal to the active communication session:
signaling information to the one or more connected terminals identifying a reconnection of the communication terminal to the active communication session and delivery of the recording of the missed information; and
stopping the recording of the missed information.

3. The method according to claim 1, wherein:
the processing of the recorded missed information comprises modifying the recorded missed information, wherein the modifying involves conditioning the recorded missed information by one or more of selective sound filtering and silent period removal; and
the delivering of the subsequently recorded missed information comprises:
providing a playback of the recorded missed information modified by the conditioning process; and
providing the playback at an adjusted speed that is less than or greater than the normal speed of the recording of the missed information when the user preference includes a selection of a speed different than the normal speed.

4. The method according to claim 1, wherein:

the recording of the missed information communicated comprises recording at least one of a voice communication, a video communication, and a text communication; and the delivering of the recording of the missed information exchange comprises delivering one or more of a voice, video, text, and multimedia communication to the communication device based on the type of missed information recorded and an output capability of the communication terminal.

5. The method according to claim 1, further comprising:
rejoining a reconnected communication terminal to the active communication session after delivering the recorded missed information to the reconnected communication terminal;
discarding the recorded missed information after delivery of the recorded missed information to the reconnected communication terminal; and
in response to the communication terminal does not reconnecting to the active communication session within a pre-established time, stopping the recording and discarding the recording of the missed communication.

6. The method according to claim 1, further comprising:
receiving an input from the communication terminal prior to a disconnection of the communication terminal, which input indicates a disconnection of the communication terminal is a deliberate disconnection that should not trigger a recording of missed communication;
detecting a subsequent disconnection of the communication terminal; and
in response to receiving the input prior to detecting the subsequent disconnection, turning off a recording feature that defaults to record missed information following detection of a disconnection by the communication terminal.

7. A communication system for recording missed information exchange during an active communication session of one or more connected user terminals for a reconnected user terminal, the system comprising:
at least one processor which executes a set of instructions, that cause the at least one processor to:
receive terminal preferences for recording missed information and delivering recorded missed information;
store the terminal preferences;
detect disconnection of a communication terminal from the active communication session;
in response to detecting the disconnection, automatically record missed information communicated by the one or more connected terminals remaining in the active communication session;
process subsequently recorded missed information in accordance with the stored terminal preferences;
detect reconnection of the communication terminal to the active communication session; and
autonomously deliver a recording of the missed information to the reconnected communication terminal, wherein the instruction that caused the processor to autonomously deliver the recording includes instructions that cause the processor to deliver the subsequently recorded missed information according to the stored terminal preferences.

8. The system according to claim 7, wherein the at least one processor executing the set of instructions, further cause the at least one processor to:
responsive to detecting reconnection of the communication terminal to the active communication session:
signal information to the one or more connected terminals identifying a reconnection of the communication terminal to the active communication session and delivery of the recording of the missed information; and
stop the recording of the missed information.

9. The system according to claim 7, wherein:
the instructions to process the recorded missed information comprises instructions that further cause the at least one processor to modify the recorded missed information, wherein the modifying involves conditioning the recorded missed information by one or more of selective sound filtering and silent period removal; and
the instructions to deliver the subsequently recorded missed information comprises instructions that further cause the at least one processor to:
provide a playback of the recorded missed information modified by the conditioning process; and
provide the playback at an adjusted speed that is less than or greater than the normal speed of the recording of the missed information when the user preference includes a selection of a speed different than the normal speed.

10. The system according to claim 7, wherein:
the instructions to record the missed information communicated comprises instructions executable by the at least one processor to record at least one of a voice communication, a video communication, and a text communication; and
the instructions to deliver the recording of the missed information exchange comprises instructions executable by the at least one processor to deliver one or more of a voice, video, text, and multimedia communication to the communication device based on the type of missed information recorded and an output capability of the communication terminal.

11. The system according to claim 8, wherein the at least one processor executing the set of instructions when executed further cause the at least one processor to:
rejoin a reconnected communication terminal to the active communication session after delivering the recorded missed information to the reconnected communication terminal;
discard the recorded missed information after delivery of the recorded missed information to the reconnected communication terminal;
in response to the communication terminal not reconnecting to the active communication session within a pre-established time, stop the recording and discard the recording of the missed communication;
receive a signal from the communication terminal prior to a disconnection of the communication terminal, which signal indicates a disconnection of the communication terminal is a deliberate disconnection that should not trigger a recording of missed communication;
detect a subsequent disconnection of the communication terminal; and
in response to receiving the signal prior to detecting the subsequent disconnection, turn off a recording feature that defaults to record missed information following detection of a disconnection by the communication terminal.

12. A computer program product including a computer readable device having a set of instructions executable by a processor to:
receive user preferences for recording missed information and delivering recorded missed information;

store the user preferences;

detect disconnection of a communication terminal from the active communication session;

in response to detecting the disconnection, automatically record missed information communicated by the one or more connected terminals remaining in the active communication session;

detect reconnection of the communication terminal to the active communication session;

process subsequently recorded missed information in accordance with the stored user preferences; and autonomously deliver a recording of the missed information to the reconnected communication terminal, wherein the instruction to autonomously deliver the recording includes instructions that cause the processor to deliver the subsequently recorded missed information according to the stored user preferences.

13. The computer program product according to claim 12, further comprising instructions executable by the processor to:

responsive to detecting reconnection of the communication terminal to the active communication session:

signal information to the one or more connected terminals identifying a reconnection of the communication terminal to the active communication session and delivery of the recording of the missed information; and stop the recording of the missed information.

14. The computer program product according to claim 12, wherein:

the instructions to process the recorded missed information comprises instructions executable by the processor to modify the recorded missed information, wherein the modifying involves conditioning the recorded missed information by one or more of selective sound filtering and silent period removal; and the instructions to deliver the subsequently recorded missed information comprises instructions executable by the processor to:

provide a playback of the recorded missed information modified by the conditioning process; and provide the playback at an adjusted speed that is less than or greater than the normal speed of the recording of the missed information when the user preference includes a selection of a speed different than the normal speed.

15. The computer program product according to claim 12, wherein:

the instructions to record the missed information exchange comprises instructions executable by the processor to record at least one of a voice communication, a video communication, and a text communication; and the instructions to deliver the recording of the missed information communicated comprises instructions executable by the processor to deliver one or more of a voice, video, text, and multimedia communication to the communication device based on the type of missed information recorded and an output capability of the communication terminal.

16. The computer program product according to claim 12, wherein the instructions further comprises instructions executable by the processor to:

rejoin a reconnected communication terminal to the active communication session after delivering the recorded missed information to the reconnected communication terminal;

discard the recorded missed information after delivery of the recorded missed information to the reconnected communication terminal; and in response to the communication terminal not reconnecting to the active communication session within a pre-established time, stop the recording and discard the recording of the missed communication.

17. The computer program product according to claim 12, further comprising instructions executable by the processor to:

receive a signal from the communication terminal prior to a disconnection of the communication terminal, which signal indicates a disconnection of the communication terminal is a deliberate disconnection that should not trigger a recording of missed communication;

detect a subsequent disconnection of the communication terminal; and in response to receiving the signal prior to detecting the subsequent disconnection, turn off a recording feature that defaults to record missed information following detection of a disconnection by the communication terminal.

* * * * *